July 1, 1924.
P. B. CAMP
1,499,342
BRAKE MECHANISM FOR RAILWAY CARS
Filed July 11, 1923   2 Sheets-Sheet 1
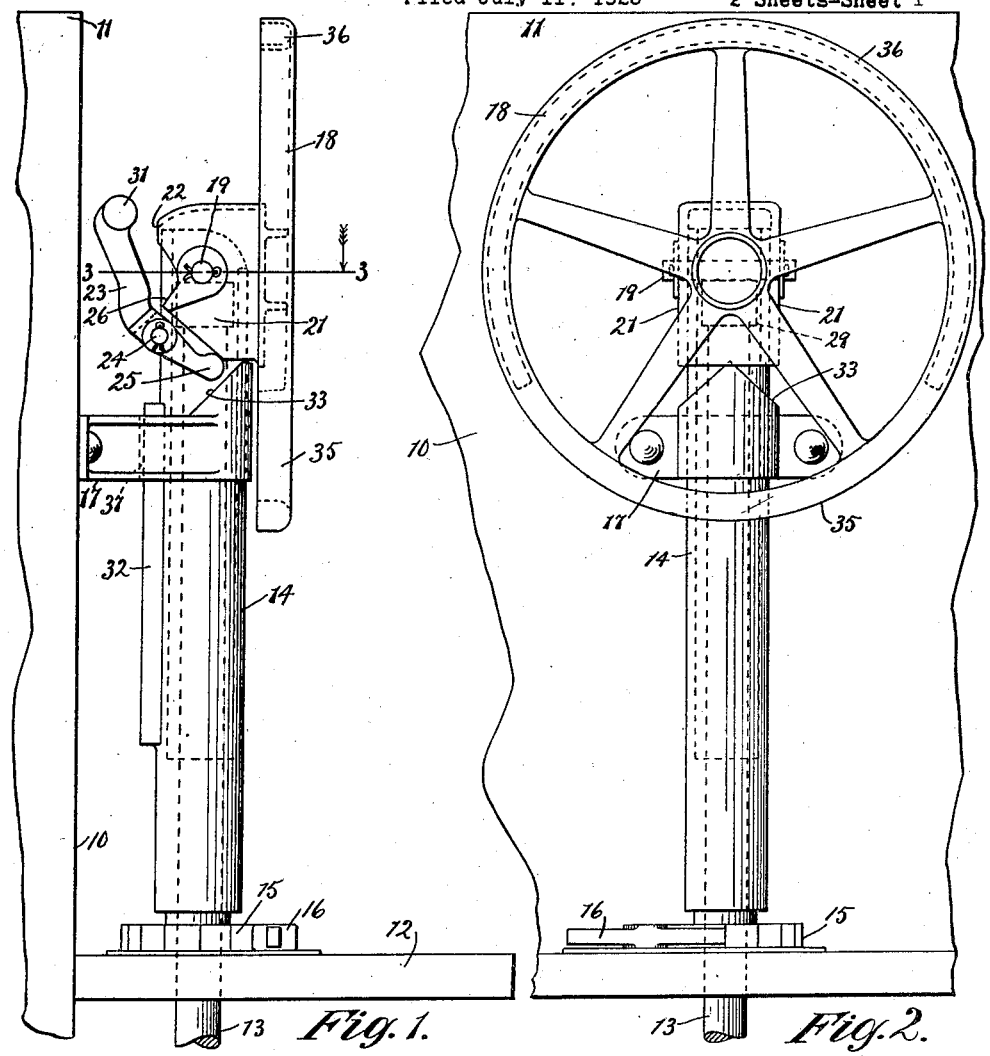
Fig.1.   Fig.2.
Fig.3.
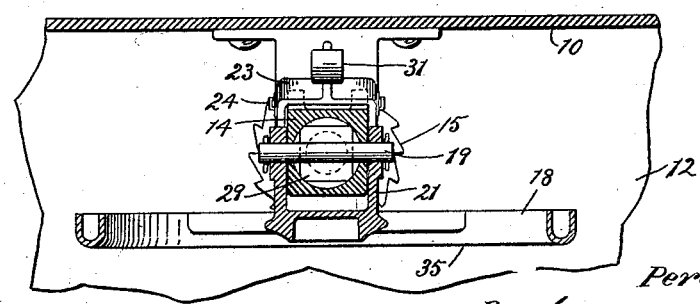
Inventor:
Percy B. Camp
By Gillson & Mann
Attys.

July 1, 1924.
P. B. CAMP
1,499,342
BRAKE MECHANISM FOR RAILWAY CARS
Filed July 11, 1923  2 Sheets-Sheet 2
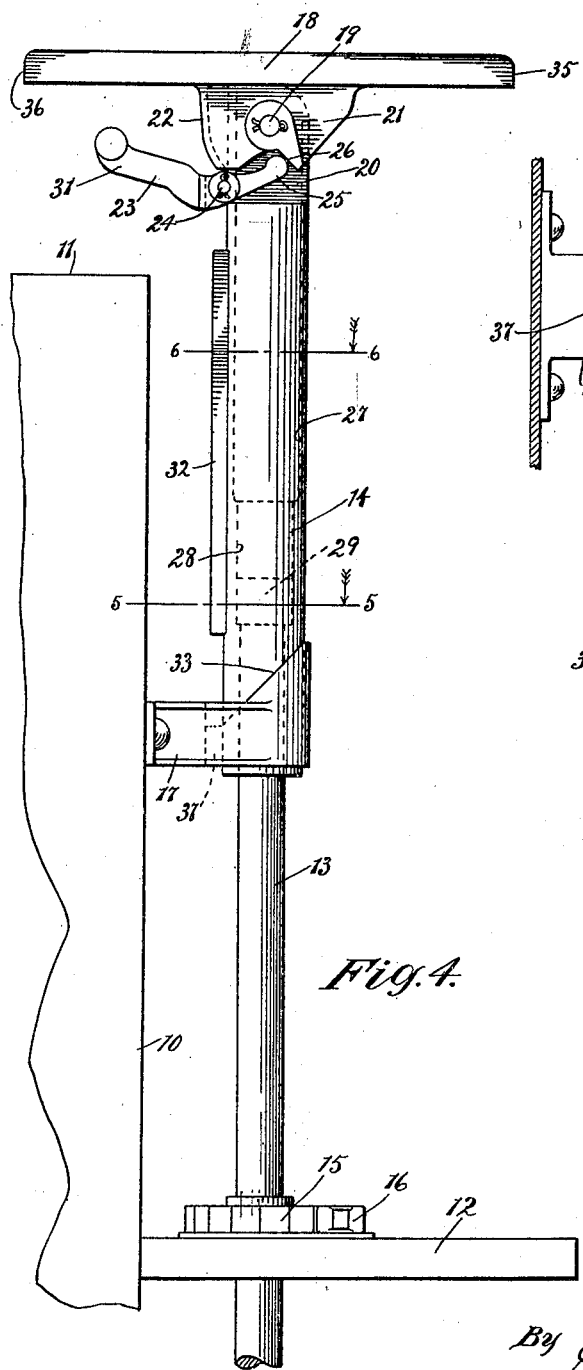
Inventor:
Percy B. Camp
By Gillson & Mann
Att'ys Patented July 1, 1924.

1,499,342

UNITED STATES PATENT OFFICE.

PERCY B. CAMP, OF MAYWOOD, ILLINOIS, ASSIGNOR TO UNIVERSAL DRAFT GEAR ATTACHMENT COMPANY, A CORPORATION OF ILLINOIS.

BRAKE MECHANISM FOR RAILWAY CARS.

Application filed July 11, 1923. Serial No. 650,872.

*To all whom it may concern:*

Be it known that I, PERCY B. CAMP, a citizen of the United States, and resident of Maywood, county of Cook and State of Illinois, have invented certain new and useful Improvements in Brake Mechanism for Railway Cars, of which the following is a specification, and which are illustrated in the accompanying drawings, forming a part thereof.

The use of loading and unloading machinery makes brake staffs projecting above the tops of gondola, and similar cars, a constant source of inconvenience and annoyance to users of such machinery and, due to frequent injury, the brake staffs cause much loss by reason of delays and cost of repairs.

The principal object of this invention is to provide a hand brake mechanism in which the hand wheel is normally folded and below the top of the car, but may be readily raised to a convenient position for use, and will automatically descend and fold upon being released by the brake.

Further objects and advantages of the invention will become apparent as the disclosure proceeds and the description is read in connection with the accompanying drawing illustrating a selected embodiment of the invention, and in which—

Fig. 1 is a side elevation of a brake mechanism made according to the invention and showing the hand wheel in folded, or inoperative position;

Fig. 2 is an end elevation of the mechanism shown in Fig. 1;

Fig. 3 is a transverse sectional view taken on the line 3—3 of Fig. 1;

Fig. 4 is a side elevation showing the mechanism extended with the wheel in operative position above the top of the car, and Figs. 5 and 6 are sectional views taken on the lines 5—5 and 6—6 of Fig. 4.

The end wall of the car is indicated at 10 and top at 11. Secured to the car at the end is a step, platform, or the like 12, on which the brakeman may stand in applying the brakes. A brake staff connected with the usual, or any suitable brake applying device, is suitably mounted at the end of the car, and according to this invention it is composed of a lower section 13 and an upper section 14 telescoping therewith. The lower section takes the form of the usual brake staff and is equipped with a suitable ratchet wheel 15 for cooperation with a pawl 16, by which the brakes may be held in applied position.

The upper section 14 of the shaft is here shown as being tubular and journaled in a suitable bracket 17 to have both rotary and sliding movement. The hand wheel 18 is pivoted to the upper end of the section 14 on a pin 19 extending transversely to the brake staff, thereby permitting the wheel to fold to the position shown in Fig. 1, or to rotate to the position shown in Fig. 4, as occasion may require.

In the present illustration the upper end 20 of the section 14 is rectangular in cross section and the lower face of the wheel is equipped with flanges 21 straddling this end 20, and receiving the pivot pin 19.

At one side the flanges 21 are connected by an end flange 22 adapted to come against the side of the squared end 20, and limit the counterclockwise rotation of the hand wheel.

Preferably a pawl 23, here shown as gravity actuated, is pivoted on the upper section 14, at 24 and has arms 25 arranged to cooperate with faces 26 on the flanges 21 to maintain the hand wheel in the position shown in Fig. 4.

Means are provided to effect a driving engagement between the upper and lower sections of the brake staff when the upper section is raised to operative position and preferably this engagement is broken when the mechanism assumes its inoperative position so that the lower section 13 may rotate freely, independent of the wheel and the upper section. A convenient means is to provide the upper section with cylindrical bore 27 which merges into a squared or other non-circular bore, 28, adjacent to its lower end which cooperates with a complemental head 29 on the upper end of the lower section 13.

Means may be provided to lock the staff sections in extended relation if desired, but by preference the upper section descends as soon as the brakeman releases it, and it is intended that the long arm 31 of the pawl 23 shall come in contact with some fixed part of the car when the upper section 14 descends, so that the wheel may be released and automatically fold with the telescoping of the staff. This makes it necessary to have the axis 19, about which the wheel swings, assume a certain definite relationship with respect to the car each time the upper section of the staff approaches its lower position. This result may be accomplished by providing the upper sleeve section 14 with a finger 32 and the bracket 17 with a suitable cam face 33, in this instance inclined, as shown particularly in Figs. 1, 2 and 3. By such an arrangement the upper section 14 will always descend with the pin 19 in proper relationship to the car.

It is desirable to have the hand wheel normally remain in the folded position during travel, neither swinging about the axis 19 nor about the axis of the brake staff. By making one side of the wheel heavier than the other, as for example, by having a portion 35 of its rim solid and another portion 36, hollow, it would have a tendency to fold. By making the finger 32 take the form of a key or feather, and providing the bracket 17 with a complemental slot 37, the upper section 14 of the staff will be held against rotation and, therefore, the hand wheel will normally remain substantially parallel to the end of the car, or in any other relation that may be desired.

When it is desired to apply the brakes, the brakeman grasps the hand wheel and raises it from the position shown in Fig. 1 to the position shown in Fig. 4, when the pawl 23 will support the hand wheel in fixed relation to the upper section of the staff and the brakes may be conveniently applied in the usual way. The side pull on the wheel will be sufficient to prevent the upper section of the staff from sliding downwardly on the lower section. As soon as the brakes are applied the brakeman need only release his hold in the hand wheel when the parts will automatically assume the folded position shown in Figs. 1 and 2. The upper section 14 of the shaft descends under action of gravity taking with it the hand wheel and the pawl 23.

If the key 32 is aligned with the slot 37, the arm 31 of the pawl 23 will strike the top of the car and be moved to release the hand wheel which will tilt by gravity, due to the weighted side 35. If the key 32 is not aligned with the slot 37 the lower end of the key will come in contact with the cam 33 and the upper section 14 will be rotated until the key does align with the slot, which will bring the pawl 23 into position to strike the top of the car with the result described.

While I have disclosed the invention as applied to brake mechanisms for open top cars I realize that it may be used on other cars and for other purposes, as for example, for closing doors of dumping cars and the like, and I do not wish to be limited except as is made necessary by the prior art.

I claim as my invention:

1. In a device of the class described, the combination of a car, a shaft including telescoping upper and lower sections, a hand wheel hinged to the upper section, a pawl for locking the hand wheel in operative position and means for effecting a release of the pawl when the upper section is lowered.

2. In a device of the class described, the combination of a car, a shaft including telescoping upper and lower sections, a hand wheel hinged to the upper section, a pawl for locking the hand wheel in operative position to cause the pawl to engage the car when the upper section descends.

3. In a device of the class described, the combination of a car, a shaft section journaled thereon and having longitudinal movement, a cam and means on the shaft section cooperating with the cam to cause the shaft section to assume a selected relationship with respect to the car, and a folding hand wheel carried by the shaft section.

4. In a device of the class described, the combination of a car, a shaft including upper and lower telescoping sections, means for effecting a driving engagement between the sections when they are extended, means for giving the upper section rotary movement when it is lowered, and a hand wheel hinged to the upper section.

5. In a device of the class described, the combination of a car, a shaft including telescoping upper and lower sections, means to effect a driving engagement between the sections when the upper section is raised and means to secure the upper section against rotation when it is lowered.

6. In a device of the class described, the combination of a car, a shaft including telescoping upper and lower sections, a hand wheel pivoted to the upper section on an axis transverse thereto and means to cause said axis to assume a selected relationship with respect to the car upon the descent of the upper section.

7. In a device of the class described, the combination of a car, a shaft including telescoping upper and lower sections, a hand wheel pivoted to the upper section on an axis transverse thereto, and cooperating means on the car and the upper section to cause said axis to assume a selected relationship with respect to the car upon the descent of the upper section.

8. In a device of the class described, the combination of a car, a shaft including telescoping upper and lower sections, a hand wheel pivoted to the upper section on an axis transverse thereto and means to cause the hand wheel to fold when the upper section is lowered.

9. In a device of the class described, the combination of a car, a shaft including telescoping upper and lower sections, means for effecting a driving connection between the upper and lower sections when the upper portion of the former is above the upper surface of a car, and the hand wheel pivoted to the upper end of the upper shaft section.

10. In a device of the class described, the combination of a car having an upwardly extending end wall, a hand wheel, an extensible shaft including sections, means for effecting a driving connection between said sections, and means for hinging the hand wheel to one of the shaft sections to swing about an axis transverse thereto, said last mentioned shaft section being moveable between a position in which the hand wheel may lie in a plane transverse to the shaft and overhang the upwardly extending wall, and a position in which the hand wheel may lie in a plane extending lengthwise to the shaft and entirely below the top of said end wall.

11. In a device of the class described, a car having an upwardly extending end wall, a hand wheel, a sectional shaft rotatably mounted at a distance from the end wall less than the radius of the hand wheel, a hinge connection between the hand wheel and one section of the shaft permitting the wheel to swing between a position at right angles to the shaft and a position alongside the shaft, said shaft being extensible between a position in which the wheel may overhang the end wall and a position in which the wheel may lie alongside the shaft and be entirely below the top of the end wall.

12. In a device of the class described, the combination of a car having an upwardly extending end wall, a brake shaft and a hand wheel hinged to the shaft to swing between a position at right angles thereto and a position alongside the shaft, and means for rotatably mounting the shaft at a distance from the end wall less than the radius of the hand wheel and permitting the shaft to be raised to a position in which the hand wheel may be at right angles to the shaft and project above the top of the end wall, and a position in which the hand wheel may lie alongside the shaft and be entirely below the top of the end wall.

PERCY B. CAMP.